United States Patent Office 3,433,698
Patented Mar. 18, 1969

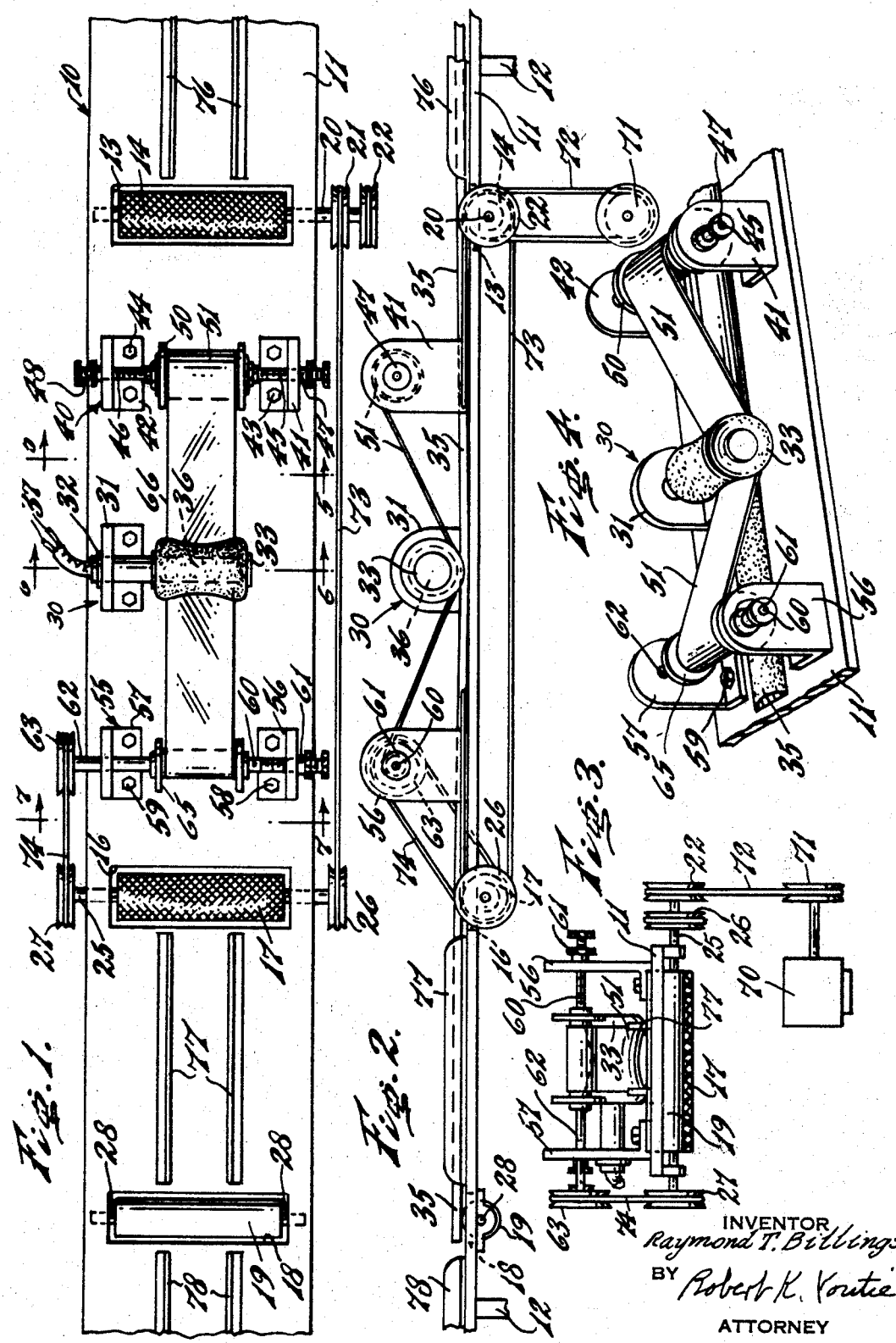

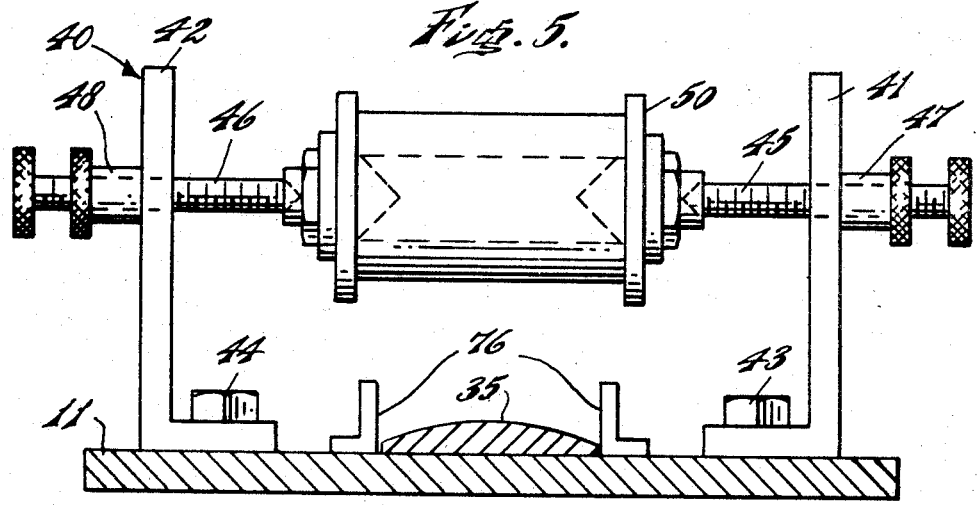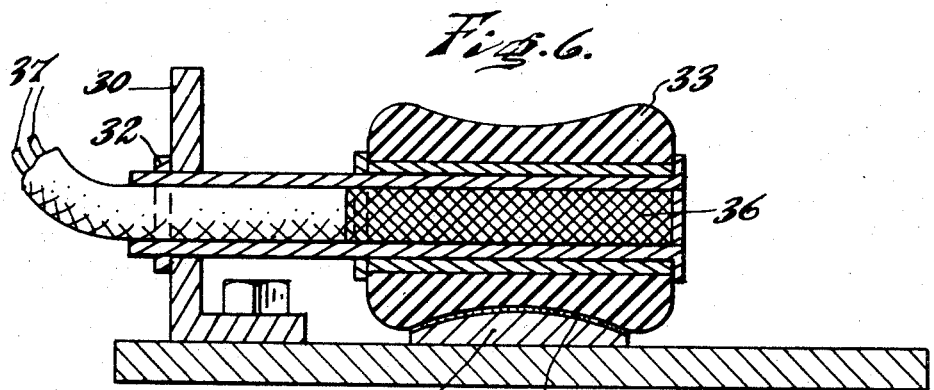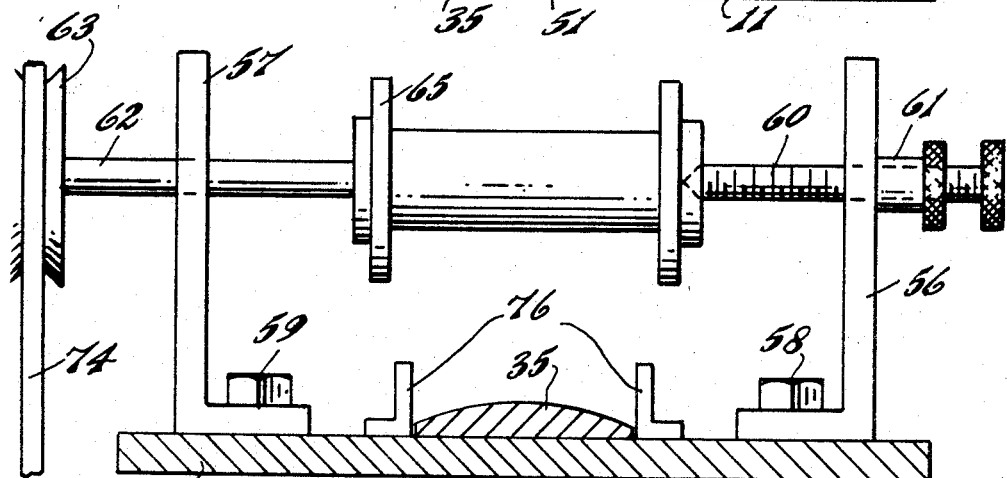

3,433,698
APPARATUS FOR COATING ELONGATE WORK
Raymond T. Billings, 318 Mount Pleasant Ave.,
Ambler, Pa. 19002
Filed May 13, 1963, Ser. No. 280,035
U.S. Cl. 156—540           6 Claims
Int. Cl. B32b 31/08

This invention relates generally to apparatus for the treatment of elongate work or molding, and is especially concerned with the surface finishing or coating of elongate work.

While the apparatus of the present invention have been primarily developed for use in the gilding or coating with gold of molding, as for picture frames, furniture, building materials, and the like, it is appreciated that the invention is not so limited but capable of many varied coating applications, all of which are intended to be comprehended herein.

As is well known in the trade, the gilding or gold-coating of molding has heretofore been extremely expensive, as requiring a great amount of tedious and highly skilled hand work. In addition, the resultant product often lacked uniformity in the application of gold, and the gold was subject to peeling, accidental removal, and the like.

Accordingly, it is an important object of the present invention to provide a unique apparatus for coating elongate work, such as the gilding or gold-coating of molding, which overcomes the above-mentioned difficulties, is substantially automatic to effect considerable savings in labor costs, produces a superior quality of coated product with substantial savings in gold or other coating material, and which may be achieved with relatively inexpensive equipment.

It is another object of the present invention to provide a coating apparatus having the advantageous characteristics mentioned in the preceding paragraph, which apparatus is extremely simple in construction, durable and entirely reliable throughout a long useful life, and which can be economically manufactured, installed and maintained.

Other objects of the present invention will become apparent by reading the following specifications and referring to the accompanying drawings, which form a material part of this disclosure.

The invention accordingly consists in the features of construction, and combinations and arrangements of elements which will be exemplified in the following description, and of which the scope will be indicated by the appended claims.

In the drawings:

FIGURE 1 is a top plan view showing coating apparatus constructed in accordance with the teachings of the present invention;

FIGURE 2 is a side elevational view of the apparatus of FIGURE 1;

FIGURE 3 is an end elevational view of the apparatus of FIGURE 1;

FIGURE 4 is a partial top perspective view showing the coating station of the apparatus of FIGURE 1;

FIGURE 5 is a sectional elevational view taken generally along the line 5—5 of FIGURE 1;

FIGURE 6 is a sectional elevational view taken generally along the line 6—6 of FIGURE 1; and FIGURE 7 is a sectional elevational view taken generally along the line 7—7 of FIGURE 1.

Referring now more particularly to the drawing, and specifically to FIGURES 1-3 thereof, a support, table or bed is generally designated 10 and may be constituted of a generally horizontal plate 11, supported in elevated position by legs 12, or other suitable framework. The bedplate 11 is of elongate configuration and may be formed at one location with a laterally extending upwardly facing opening or through hole 13 for receiving a feed roll 14. As the path of work movement is illustrated in the direction of arrow 15, from right to left, the rightward bed locations will be designated as forward or ahead and the leftward locations as rearward or behind.

Thus, rearward or behind the feed-roll opening 13, the bedplate 11 is formed with a laterally extending upwardly facing opening or through hole 16 for receiving a withdrawal roll 17. Rearward or behind the bed opening 16 may be formed in the bedplate 11 an additional upwardly facing opening or through hole 18 for receiving a conveyor roller 19.

The feed roll 14 may be generally cylindrical and knurled or otherwise provided with a roughened external surface, if desired. As may be observed in FIGURES 1 and 2, the feed roll 14 is disposed with its axis generally horizontal and extending generally normal to the longitudinal direction of the bedplate, being mounted therein for axial rotation and having its upper side advantageously projecting slightly above the upper surface of the bedplate. More specifically, the feed roll 14 may be coaxially mounted or keyed on a generally horizontal shaft 20 journaled in the bedplate 11. The shaft 20 may project laterally beyond the bedplate 11 and there be provided with a pair of transmission wheels or pulleys 21 and 22.

The withdrawal roll 17 may be similar to the feed roll 14, of cylindrical configuration and externally knurled or roughened surface, disposed generally horizontally within the bedplate opening 16 having its axis extending normal to the longitudinal direction of the bedplate. The withdrawal roll 17 may be coaxially mounted on or keyed to a shaft 25 having its opposite ends journaled in the bedplate 11 and projecting laterally therebeyond. In this rotatably mounted condition, the withdrawal roll 17 may advantageously project slightly above the upper surface of the bedplate 11, while opposite ends may be respectively provided with transmission wheels or pulleys 26 and 27, the former being on the forward side of the bedplate, the lower side as seen in FIGURE 1 substantially coplanar with pulley 21. The roll 19 located in the opening 18 may also be generally cylindrical, disposed horizontally within and projecting slightly above the upper surface of bedplate 11, being journaled in the latter by a coaxial shaft 28.

Located on the bedplate 11, in the space intermediate the feeding and withdrawal rolls 14 and 17, is a coating station, generally designated 30. The coating station may include an upstanding journal bracket or pedestal 31 mounted on the upper side of the bedplate 11 offset rearwardly from the center line thereof so as to be adjacent to the rear side of the bedplate. The pedestal journal 31 may be suitably affixed to the bedplate 11, as by welding or other appropriate means, and may rotatably support a hollow shaft 32 extending generally forwardly from the pedestal normal to the longitudinal axis of the bedplate in an overhanging relation spaced above a laterally medial region of the bedplate. The shaft 32 may be axially rotatable and carry on its forward end a pressure roll 33 of specific configuration for conforming rolling engagement with a workpiece, as at 35, moving longitudinally along the bed 10 between the upper side of the bedplate 11 and the pressure roll. Thus, the pressure roll 33 is mounted for rotation about a generally horizontal axis extending generally normal to and spaced over the bedplate 11. The pressure roll 33, or the outer surface thereof, may advantageously be fabricated of material having suitable heat-transmission and resilient characteristics, such as silicone rubber; and, suitable heating means such as an internal heater 36 may be located interiorly of the pressure roll and energized by electricity via conductors 37 passing interiorly of the shaft 32. The pressure roll 33 is thereby adapted to apply pressure and heat to the workpiece or molding 35 beneath the roll, as will appear hereinafter in greater detail.

Located ahead or forward of the pressure roll 36, as between the latter and the feed roll 14, there is provided a supply station 40 arranged laterally across the upper side of the bedplate 11. More particularly, the supply station 40 may include a pair of laterally spaced, upstanding journal brackets or pedestals 41 and 42 respectively adjacent to the forward and rearward sides of the bedplate 11. The spaced journal pedestals 41 and 42 may be suitably secured to the bedplate in any desired manner, such as by bolts 43 and 44.

Extending through the pedestals 41 and 42, respectively, are pivot elements or threaded pins 45 and 46, such pins being in horizontal, end-to-end spaced alignment with each other generally normal to the longitudinal direction of the bedplate 11. The pins 45 and 46 may be respectively threadedly engaged in the brackets or pedestals 41 and 42, being respectively provided with locknuts 47 and 48 retaining the pins in a selected position of adjustment relative to their respective brackets.

Journaled between the adjacent ends of the pins 45 and 46 is a supply spool or roll 50 having coiled thereabout a flexible strip of carrier material 51 provided with a transferable coating, say of gold. The supply spool 50 may be adjusted, removed and replaced by appropriate manipulation of the pins 45 and 46, and in operation is journaled for axial rotation about the aligned axes of the pins.

Rearward or behind the coating stations 30, as between the latter and the withdrawal roll 17, there is provided on the bedplate 11 a take-up station 55. The take-up station 55 may include a pair of laterally spaced, facing pedestal brackets or journals 56 and 57, respectively adjacent to the front and rear sides of the bedplate 11 and suitably secured thereto, as by fasteners 58 and 59. The forward bracket or pedestal 56 may be provided with a threaded pin 60 extending horizontally in threaded relation through the bracket generally normal to the longitudinal direction of the bedplate 11 and spaced thereabove. A locking nut 61 may be carried by the pin 60 for engagement with the bracket 56 to hold the pin in a selected position of its threaded adjustment relative to the bracket.

In axial alignment with the pin 60, and rotatably carried by the pedestal 57 adjacent to the rear side of the bedplate 11 is a shaft 62. The shaft 62 may project rearward beyond the bedplate 11 and there be provided with a transmission wheel or pulley 63 substantially coplanar with the pulley 27. Located between the pedestals 56 and 57, spaced over the bedplate 11, is a take-up spool 65 which is carried by the pin 60 and shaft 62 for rotation with the latter. That is, the take-up spool 65 is disposed generally horizontally in spaced relation over the bedplate 11 and mounted coaxially with the aligned pin 60 and shaft 62 for rotation with the latter shaft. As seen in FIGURES 1, 2 and 4, the carrier strip 51 extends from the supply roll 50 as a web 66 longitudinally of the bedplate 11 beneath the pressure roll 33 and thence about the take-up spool 65, as at 67.

Suitable drive means may be provided, such as a motor 70 mounted beneath the bedplate 11 and carrying a pulley 71 directly below the pulley 22. A power-transmission member or belt 72 may be trained about the pulleys 71 and 22 to drive the shaft 20 and feed roll 14, while a power-transmission member or belt 73 may be trained about the pulleys 21 and 26 to effect powered rotation of the shaft 25 and withdrawal roll 17. In addition, a power-transmission member or belt 74 is trained about the pulleys 27 and 63 to drive the shaft 62 and take-up spool 65 from the shaft 25.

The longitudinally extending, laterally medial region of the bedplate 11 provides a pathway for the work 35 to move along the bed, and at suitable locations on the bed there may be provided guideways or rails for guiding the work. For example, a pair of longitudinally extending, laterally spaced rails 76 may be affixed to the upper side of the bedplate 11 forward of the feed roll 14. Similar guide rails 77 may extend longitudinally on the upper side of the bedplate 11 between the withdrawal roll 17 and roll 19. Additional similar guide rails may be provided on the bedplate 11 behind the roll 19, as at 78.

In operation, the work 35 is fed along the upper side of the bedplate 11 between the entry guides 76, over the feed roll 14 and thence through the coating station 30. That is, the work 35 passes through the coating station 30 between the underside of the pressure roll 33 and the bedplate 11; and, simultaneously the web 66 is drawn from the supply 50 to the take-up spool 65 between the upper surface of the work 35 and underside of the pressure roll 33. It is preferred that the web 66, work 35 and surface of pressure roll 33 all have substantially the same linear velocity to effect transfer of coating material from the underside of the web 66 to the upper surface of the work 35 with a minimum of relative movement or slippage. In this manner pressure may be effected by substantially pure pressure and heat. The particular mechanism of the transfer may be conventional, such as is presently employed in hot stamping of gold.

Thus, it will now be appreciated that the pressure roll 33 is in a rolling relation with respect to the work 35. Also, the specific configuration of the pressure roll is such as to conform to the upper surface of the work and thereby flex the web 66 into conforming engagement with the work. Of course, if full conforming engagement is not desired, say to coat only a portion of the upper work surface, the roll may be appropriately configured.

As the work 35 proceeds past the coating station 30 and take-up station 55, it is engaged from beneath by the powered withdrawal roll 70 for continued withdrawal and exit movement between the guides 77, over the roll 19, and between the guides 78.

Upon constant speed of drive motor 70, the feed roll 14 and withdrawal roll 17 will be driven at constant speed. Further, the slight projection of the feed and withdrawal rolls 14 and 17 above the bedplate 11 insures effective engagement of the rolls with the underside of the work, especially as the work is held down against the bedplate by the action of pressure roll 33 intermediate the feed and withdrawal rolls. While the speed of rotation of feed and withdrawal rolls 14 and 17 may be substantially constant, the linear speed of web 66 may tend to increase as the diameter of take-up spool 65 increases upon continued coiling of the web. However, the tightness of belt 74 may be such as to permit slight slippage at pulley 63 and thereby maintain the speed of web 66 constant as controlled by the relative rolling action of the pressure wheel 33 with respect to the work 35 and the tangential sandwiched relation therebetween of the web.

Thus, the frictional engagement of the rolls 14 and 17 with the work 35 serve both to effect the necessary feeding movement of the work, and cooperate with the action of the bedplate 11 immediately below the pressure roll 33 to urge the work toward the roll and insure substantially nonslip engagement of the work until the web 66, while the web is deflected by the roll into the desired conforming relation with the work.

From the foregoing it is seen that the present invention provides apparatus for coating elongate work which fully accomplishes intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Apparatus for coating relatively rigid elongate work, said apparatus comprising a work feed roll engageable with the work to move the latter longitudinally along a predetermined substantially linear path, a pressure roll having a resiliently yieldable heat-conducting external surface, said pressure roll being located adjacent to the path of work movement for rolling relation with the work, said feed roll located adjacent to the work path on the opposite side thereof as said pressure roll for rolling engagement with the work under pressure by said pressure roll, pressure roll heating means positioned internally of said pressure roll, a supply roll mounted ahead of said pressure roll for supplying a coil of carrier material having a heat transferable coating material, a take-up roll behind said pressure roll for receiving said carrier material and drawing the latter between said pressure roll and work to transfer the coating material to the work, take-up roll rotating means establishing a rate of movement of the carrier material past said pressure roll substantially equal to the rate of movement of said work past said pressure roll and common power means for said work feed roll and for said take-up roll rotating means.

2. Apparatus according to claim 1, in combination with a withdrawal roll located adjacent to the work path on the same side as said feed roll and behind said pressure roll for withdrawing engagement with the work under pressure by said pressure and feed rolls.

3. Apparatus for coating relatively rigid elongate work, said apparatus comprising an elongate bed for movement of the work along the bed, a pressure roll having a resiliently yieldable heat-conducting external surface, said pressure roll being mounted in spaced relation over the bed intermediate the ends thereof, a work feed roll mounted in the bed ahead of the pressure roll and projecting upward from the bed for engagement with the work to feed the work longitudinally along the bed beneath the pressure roll, pressure roll heating means positioned internally of said pressure roll and carrier-strip feeding means for conveying between the work and said pressure roll a strip carrying a heat transferable coating material for transfer of the coating material to the work.

4. Apparatus according to claim 3, in combination with a withdrawal roll mounted in the bed behind the pressure roll and projecting upward from the bed for engagement with the work to withdraw the latter from beneath the pressure roll.

5. Apparatus for coating relatively rigid elongate work, said apparatus comprising an elongate bed for movement of the work along the bed, a pressure roll having a resiliently yieldable heat-conducting external surface, said roll being mounted in spaced relation over the bed intermediate the ends thereof, work-feeding means for feeding the work longitudinally along the bed beneath the pressure roll, pressure roll heating means positioned internally of said pressure roll, carrier-strip feeding means for conveying between the work and said pressure roll a strip carrying a heat transferable coating material for transfer of the coating material to the work, said carrier-strip feeding means comprising a supply roll mounted ahead of said pressure roll for supplying a coil of carrier material having a transferable coating material, a take-up roll behind said pressure roll for receiving carrier material and drawing the latter between said pressure roll and work to transfer the coating material to said work and take-up roll rotating means establishing a rate of movement of the carrier material past said pressure roll substantially equal to the rate of movement of said work past said pressure roll.

6. Apparatus according to claim 5, said work-feeding means comprising a feed roll mounted in the bed ahead of the pressure roll and projecting upward from the bed for engagement with the work to feed the latter beneath the pressure roll, and a withdrawal roll mounted in the bed behind the pressure roll and projecting upward from the bed for engagement with the work to withdraw the latter from beneath the pressure roll.

References Cited
UNITED STATES PATENTS

| | | | |
|---|---|---|---|
| 3,252,847 | 5/1966 | Morgan et al. | 156—233 |
| 1,096,822 | 5/1914 | Brandt | 156—233 |
| 2,022,484 | 11/1935 | Watkins | 118—249 |
| 3,054,715 | 9/1962 | White. | |
| 3,138,695 | 6/1964 | Bracich | 219—244 |

WALTER A. SCHEEL, *Primary Examiner.*

L. G. MACHLIN, *Assistant Examiner.*

U.S. Cl. X.R.

118—60; 156—583; 219—244